United States Patent
Wadayama et al.

(10) Patent No.: US 11,511,378 B2
(45) Date of Patent: Nov. 29, 2022

(54) FUEL NOZZLE OF GAS TURBINE COMBUSTOR AND MANUFACTURING METHOD THEREOF, AND GAS TURBINE COMBUSTOR

(71) Applicant: Mitsubishi Heavy Industries, Ltd., Tokyo (JP)

(72) Inventors: Yoshihide Wadayama, Yokohama (JP); Satoshi Kumagai, Yokohama (JP); Keisuke Miura, Yokohama (JP); Mitsuhiro Karishuku, Yokohama (JP); Satoshi Dodo, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/173,454

(22) Filed: Feb. 11, 2021

(65) Prior Publication Data
US 2021/0164661 A1    Jun. 3, 2021

Related U.S. Application Data

(62) Division of application No. 15/606,023, filed on May 26, 2017, now abandoned.

(30) Foreign Application Priority Data

Jul. 1, 2016    (JP) ................. 2016-131411

(51) Int. Cl.
*B23P 19/02* (2006.01)
*F01D 9/04* (2006.01)
(Continued)

(52) U.S. Cl.
CPC ............ *B23P 19/02* (2013.01); *F01D 9/04* (2013.01); *F23R 3/283* (2013.01); *F23R 3/286* (2013.01);
(Continued)

(58) Field of Classification Search
CPC .......... B23P 19/02; F23R 3/283; F23R 3/286; F23R 3/28; F23R 2900/00017;
(Continued)

(56) References Cited

U.S. PATENT DOCUMENTS

| | | | | |
|---|---|---|---|---|
| 4,446,100 A | * | 5/1984 | Adlerborn | C04B 35/593 264/319 |
| 4,485,961 A | * | 12/1984 | Ekbom | B23K 20/021 228/248.1 |

(Continued)

FOREIGN PATENT DOCUMENTS

| | | | | |
|---|---|---|---|---|
| CN | 1579830 A | * | 2/2005 | ........ B60W 30/1882 |
| CN | 102242673 A | * | 11/2011 | ............. F01D 9/023 |

(Continued)

OTHER PUBLICATIONS

Li et al.; Preliminary experimental study on Hot Isostatic Pressing diffusion bonding for CLAM/CLAM; Jun. 11, 2007; Fusion Engineering and Design 82; pp. 1-7 (Year: 2007).*

(Continued)

*Primary Examiner* — Bayan Salone

(57) ABSTRACT

[Problem]
To provide a fuel nozzle for a gas turbine combustor, offering favorable durability and strength reliability.
[Solving Means]
A method for manufacturing a fuel nozzle for a gas turbine combustor, the method comprising: (a) fitting a fuel nozzle having an internal through hole into a through hole or a recess provided in a base plate; (b) bonding, by a fusion joint or a brazing joint, the fuel nozzle to the base plate in an interface therebetween on a surface of the base plate; and (c) following the step of (b), subjecting the fuel nozzle and the (Continued)

base plate to a pressure bonding process to thereby pressure bond the fuel nozzle and the base plate in the interface therebetween.

4 Claims, 9 Drawing Sheets

(51) Int. Cl.
    *F23R 3/28* (2006.01)
    *F01D 9/02* (2006.01)
(52) U.S. Cl.
    CPC ............ *F01D 9/02* (2013.01); *F05D 2300/10* (2013.01); *F05D 2300/17* (2013.01); *F05D 2300/171* (2013.01); *F23D 2213/00* (2013.01)
(58) Field of Classification Search
    CPC . B23K 15/00; B23K 15/0046; F05D 2240/35; F01D 9/02
    See application file for complete search history.

(56) References Cited

U.S. PATENT DOCUMENTS

| | | | | |
|---|---|---|---|---|
| 5,330,155 | A * | 7/1994 | Lechner | F16L 29/02 251/149.6 |
| 5,761,907 | A | 6/1998 | Pelletier et al. | |
| 9,027,349 | B2 * | 5/2015 | Miura | F23R 3/286 60/737 |
| 9,074,772 | B2 | 7/2015 | Miura | |
| 2004/0011054 | A1 * | 1/2004 | Inoue | F23R 3/10 60/776 |
| 2009/0293484 | A1 | 12/2009 | Inoue | |
| 2012/0192568 | A1 * | 8/2012 | Miura | F23R 3/286 60/39.23 |
| 2013/0029277 | A1 * | 1/2013 | Koizumi | F23R 3/343 431/354 |
| 2013/0181071 | A1 * | 7/2013 | Johnston | B23K 20/122 219/121.64 |
| 2016/0033136 | A1 | 2/2016 | Kumagai et al. | |

FOREIGN PATENT DOCUMENTS

| | | | |
|---|---|---|---|
| CN | 102901125 A | 1/2013 | |
| CN | 105318355 A | 2/2016 | |
| EP | 2 481 986 A2 | 8/2012 | |
| EP | 2 980 483 A1 | 2/2016 | |
| EP | 3109556 A1 * | 12/2016 | ............. F02C 7/222 |
| JP | 2-251383 A | 10/1990 | |
| JP | 2006-17381 A | 1/2006 | |
| JP | 2009-14297 A | 1/2009 | |
| JP | 2009-79893 A | 4/2009 | |
| JP | 2013-142534 A | 7/2013 | |
| JP | 2016-35336 A | 3/2016 | |

OTHER PUBLICATIONS

Extended European Search Report issued in counterpart European Patent Application No. 17000888.2 dated Nov. 28, 2017 (Seven (7) pages).
Chinese-language Office Action issued in counterpart Chinese Application No. 201710517482.1 dated Mar. 18, 2019 with English translation (11 pages).
Indian-language Office Action issued in counterpart Indian Application No. 201714018045 dated Jul. 9, 2019 with English translation (six (6) pages).
Japanese-language Office Action issued in counterpart Japanese Application No. 2016-131411 dated Jul. 23, 2019 with English translation (seven (7) pages).
C. Li, Preliminary experimental study on Hot Isostatic Pressing diffusion bonding for CLAM/CLAM, Jun. 11, 2007, Fusion Engineering and Design 82 (2007) 2627-2633 (Year: 2007).
"Electron Beam Welding," Web page < https://www.ebindustries.com/electron-beam-welding/>, 1 page, Jul. 6, 2015, retrieved from Internet Archive Wayback Machine < https://web.archive.org/web/20150706155702/https://www.ebindustries.com/electron-beam-welding/ > on Jul. 2, 2019 (Year: 2015).

* cited by examiner

FUEL NOZZLE OF GAS TURBINE COMBUSTOR AND MANUFACTURING METHOD THEREOF, AND GAS TURBINE COMBUSTOR

CLAIM OF PRIORITY

The present application is a divisional of U.S. patent application Ser. No. 15/606,023, filed on May 26, 2017, which claims priority from Japanese Patent application serial no. 2016-131411, filed on Jul. 1, 2016, the content of which is hereby incorporated by reference into this application.

TECHNICAL FIELD

The present invention relates to combustors and gas turbines including the combustors and, more particularly, to a fuel nozzle structure of a gas turbine combustor including a plurality of multi-hole coaxial jet burners.

BACKGROUND ART

A need exists from an environmental preservation viewpoint for further reduction in the amount of NOx in exhaust gas of gas turbines. One known combustion method of the gas turbine combustor is premixed combustion that premixes fuel with air before combustion. This can achieve a considerable reduction in the amount of NOx emissions compared with diffusion combustion in which fuel is directly injected into a combustion chamber for combustion. The premixed combustion, however, involves a higher likelihood of a backfire in which flames enter an unburned side of a fuel supply portion as a flame temperature increases. Thus, a need exists for a combustor that can reduce the amount of NOx emissions and offer backfire resistance.

A known combustor has a configuration that includes a plurality of fuel nozzles that jet fuel and an air hole plate having through holes formed therein to be associated with respective fuel nozzles. The combustor is a multi-hole coaxial jet type that achieves both backfire resistance and low NOx by forming a fuel jet spurted from the fuel nozzle and an air jet spurted from the air hole into a coaxial jet to thereby uniformly mix fuel with air for combustion.

As known art, a technique disclosed in Patent Document 1 is known. Patent Document 1 discloses a "gas turbine combustor including a fuel nozzle and a fuel nozzle header that form a coaxial jet of fuel and air, in which an air layer is provided between the fuel nozzle and the fuel nozzle header to insulate the fuel nozzle from the fuel nozzle header; the gas turbine combustor thereby reduces thermal stress produced on the thermal nozzle header and improves a service life of the thermal nozzle header.

PRIOR ART DOCUMENT

Patent Document

[Patent Document 1] JP-A-2009-14297

SUMMARY OF THE INVENTION

Problem to be Solved by the Invention

It is here noted that the multi-hole, coaxial jet burner structure includes a plurality of fuel nozzles that are disposed at small intervals. Forming a sufficient welded portion is thus difficult in bonding the fuel nozzle with a base plate (fuel nozzle header). Improvement of reliability in strength of the bond portion between the fuel nozzle and the base plate thus constitutes an important challenge.

Patent Document 1 discloses means, for example, for screwing and fixing the fuel nozzle to the base plate. Reliability in strength of the bond portion such as the welded portion is not sufficient for operation performed over a long period of time due to high-cycle fatigue in which vibration stress acts on the fuel nozzle and thermal stress produced between the fuel nozzle and the base plate.

It is an object of the present invention to provide a fuel nozzle for a gas turbine combustor, offering favorable durability and strength reliability.

It is another object of the present invention to provide a manufacturing method for a fuel nozzle for a gas turbine combustor, offering favorable durability and strength reliability.

Means for Solving the Problem

To achieve the foregoing objects, an aspect of the present invention provides a fuel nozzle for a gas turbine combustor, jetting fuel into a combustion chamber of the gas turbine combustor. The fuel nozzle is metallurgically and integrally bonded with a base plate that supports the fuel nozzle. An interface between the fuel nozzle and the base plate includes a surface in which bonding is performed by a fusion joint or a brazing joint and an inside part in which bonding is performed by pressure bonding.

An aspect of the present invention provides a method for manufacturing a fuel nozzle for a gas turbine combustor. The method includes: (a) fitting a fuel nozzle having an internal through hole into a through hole or a recess provided in a base plate; (b) bonding, by a fusion joint or a brazing joint, the fuel nozzle to the base plate in an interface therebetween on a surface of the base plate; and (c) following the step of (b), subjecting the fuel nozzle and the base plate to a pressure bonding process to thereby pressure bond the fuel nozzle and the base plate in the interface therebetween.

Effect of the Invention

In one aspect, the present invention considerably improves mechanical strength and reliability of a fuel nozzle for use in, for example, a multi-hole coaxial jet burner and enables healthy operation of a gas turbine combustor including the fuel nozzle over an extended period of time.

Problems, configurations, and effects of the invention other than those mentioned above will become apparent from the following descriptions of the embodiments of the invention.

MODES FOR CARRYING OUT THE INVENTION

Embodiments of the present invention will be described below with reference to the accompanying drawings. In each of the drawings and embodiments, like or similar elements are identified by like reference symbols and detailed descriptions of like or similar elements will not be repeated.

First Embodiment

Figure 9A:
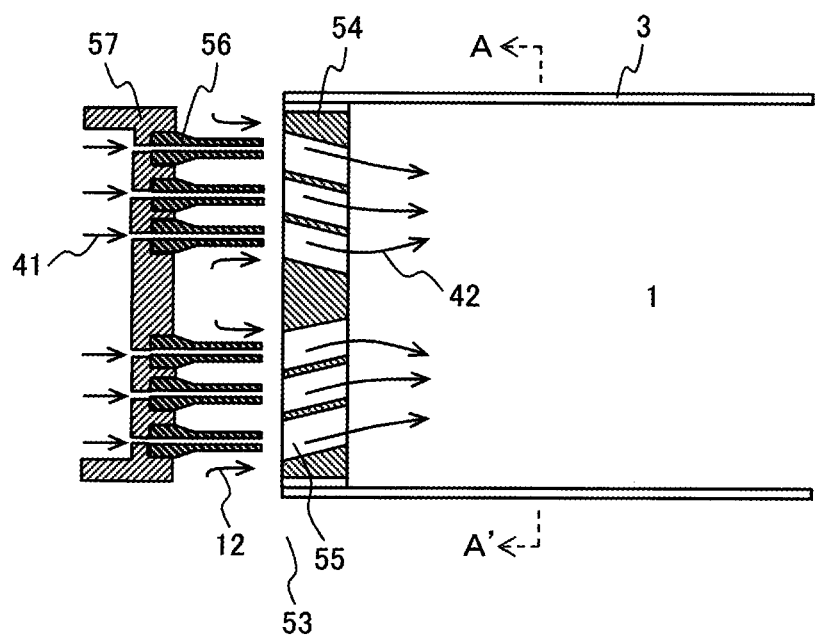
FIG. 9A is a cross-sectional view showing a schematic configuration of a gas turbine combustor according to an embodiment of the present invention.
Figure 9B:
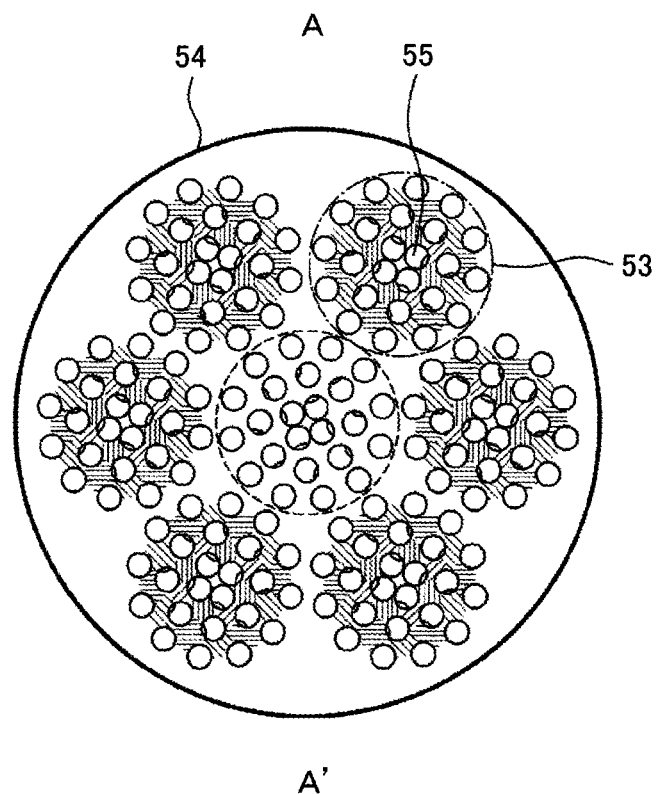
FIG. 9B is a view on arrow A-A' in FIG. 9A.

A gas turbine combustor in the present embodiment will be described below with reference to FIGS. 9A and 9B. FIG. 9A is a cross-sectional view showing a structure of main parts of the gas turbine combustor. FIG. 9B is a view on arrow A-A' in FIG. 9A. The following describes an embodiment in which the present invention is applied to a multi-hole coaxial jet burner. It is noted that FIGS. 9A and 9B are schematic drawings and the number of air holes 55 differs between FIG. 9A and FIG. 9B.

A burner 53 includes a fuel distributor (end flange) 57, a plurality of fuel nozzles 56, a combustor liner 3, and an air hole plate 54. Specifically, the end flange 57 distributes fuel 41. The fuel nozzles 56 inject the fuel 41. The air hole plate 54 has a disc shape and is disposed at an upstream side end portion of the fuel liner 3. The air hole plate 54 has a plurality of air holes 55 that face a downstream side of the fuel nozzles 56 and through which combustion air 12 passes. A mixture 42 of the fuel 41 and the combustion air 12 passes through the air hole plate 54 before being supplied to a combustion chamber 1.

Figure 10:
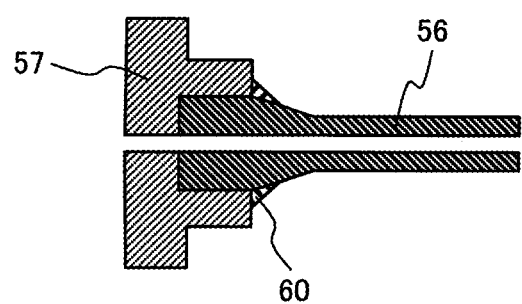
FIG. 10 is a cross-sectional view showing a known fuel nozzle.

For a comparison purpose, FIG. 10 shows an exemplary connection structure for a fuel nozzle 56 in the known art. The fuel nozzle 56 is welded to an end flange 57 that serves as a fuel distributor. The fuel nozzle 56 has a root portion bonded to the end flange 57 at a welded portion 60; however, an area of the fuel nozzle 56 which area inserted in the end flange 57 is not mechanically bonded to the end flange 57 and is yet to be deposited. Another known art arrangement, for example, is the fuel nozzle 56 screwed into the end flange 57.

Figure 1:
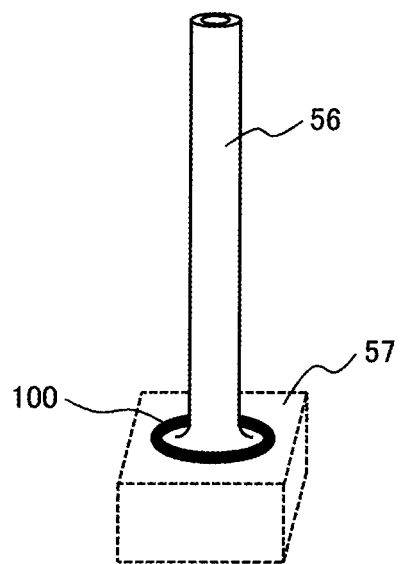
FIG. 1 is a perspective view of a fuel nozzle in a gas turbine combustor according to an embodiment of the present invention.
Figure 2:
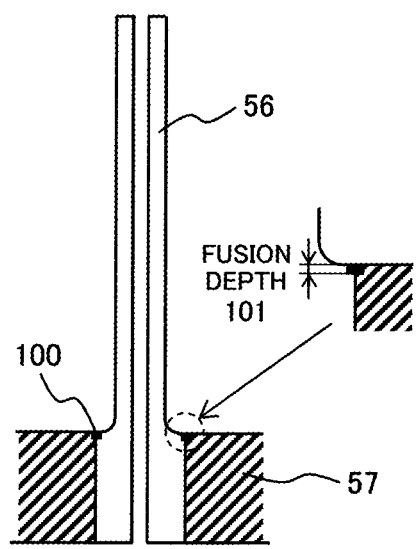
FIG. 2 is a cross-sectional view of a fuel nozzle in a gas turbine combustor according to an embodiment of the present invention.

A fuel nozzle structure of the present embodiment will be described below with reference to FIGS. 1 and 2. FIG. 1 is a view showing an appearance of the fuel nozzle 56 and the end flange 57 according to the present invention. FIG. 2 is a cross-sectional view of the fuel nozzle 56 and the end flange 57 according to the present invention. The fuel nozzle 56 used in the present embodiment has an outside diameter of φ7.0 mm and a portion of the fuel nozzle 56 inserted in the end flange 57 has an outside diameter of 0.5 mm. The nozzle has a φ2.0 mm through hole thereinside through which fuel passes. The end flange 57 has a hole having a hole diameter of 0.5 mm. The material used for both the fuel nozzle 56 and the end flange 57 is stainless steel SUS304.

As shown in FIGS. 1 and 2, the fuel nozzle structure of the present embodiment includes an electron beam weld line 100 formed at a bond portion between the fuel nozzle 56 and the end flange 57 on a surface of the end flange 57. Additionally, as shown in FIG. 2, the fuel nozzle 56 and the end flange 57 are integrated with each other having no undeposited portion at a boundary therebetween. The electron beam weld line 100 is formed to have a fusion depth 101 of 1 mm or less. As noted previously, the multi-hole coaxial jet burner structure includes a plurality of fuel nozzles that are disposed at small intervals. Thus, preferably, the electron beam weld line 100 is formed to have a width of 1 mm or less.

Figure 7:
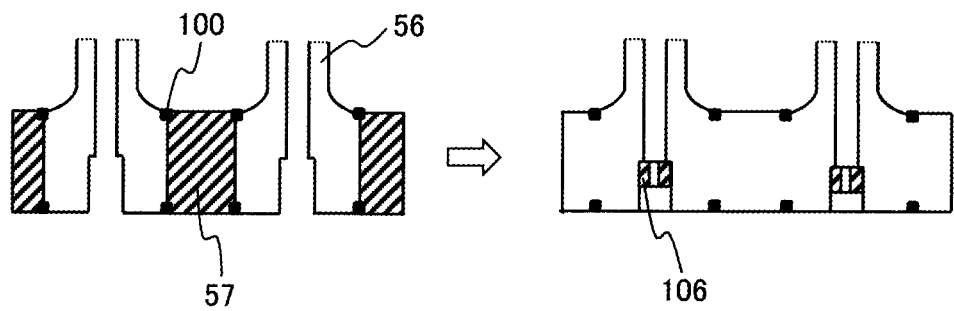
FIG. 7 is a diagram showing a manufacturing process of a fuel nozzle in a gas turbine combustor according to an embodiment of the present invention.

A manufacturing method for the fuel nozzle structure in the present embodiment will be described with reference to FIG. 7. FIG. 7 is a sectional structural drawing of the fuel nozzle 56 and the end flange 57. It is noted that FIG. 7 shows only an area near the root of the fuel nozzle 56 and omits showing a shape of a leading end portion thereof.

The fuel nozzle 56 is inserted in the hole provided in the end flange 57 and seal welding is then performed by electron beam irradiation at the boundary portion with the end flange 57 at the root portion of the fuel nozzle 56, so that the electron beam weld line 100 is formed. Similarly, the electron beam weld line 100 is also formed through seal welding by the electron beam irradiation on the side of a bottom surface of the end flange. During seal welding, a bonding interface between the fuel nozzle 56 and the end flange 57 is preferably in a vacuum state. Electron beam welding (EBW) that can emit a high energy beam in a high vacuum is thus used.

After the interface in which bonding is to be performed has been vacuum sealed, a subassembly of the fuel nozzle 56 and the end flange 57 is subjected to a hot isostatic pressing (HIP) process to thereby achieve metallurgical bonding in the bonding interface. Bonding conditions used were as follows: temperature 1100° C., pressure 120 MPa, and holding time 5 h. The application of the HIP process obtains the fuel nozzle integrated with the end flange having no undeposited portion at the boundary between the fuel nozzle 56 and the end flange 57.

Specifically, the fuel nozzle 56 is metallurgically and integrally bonded with the end flange (base plate) 57 that supports the fuel nozzle 56. In addition, the fuel nozzle 56 and the end flange (base plate) 57 have an interface including a surface in which bonding is performed by electron beam welding (fusion joint) and an inside part in which bonding is performed by the hot isostatic pressing process (pressure bonding).

It is noted that, in the present embodiment, an orifice 106 for flow rate adjustment is press-fitted from the bottom surface of the integrated fuel nozzle as illustrated at right in FIG. 7. A flow rate characteristic of a group of fuel nozzles is thereby made uniform.

It is here noted that the electron beam welding for vacuum sealing the bonding interface is required only to provide a fusion zone that is such that a sealed portion is not broken during the hot isostatic pressing (HIP) process and is not required to provide a penetration depth to be achieved by ordinary electron beam welding. In the present embodiment, the fusion zone has a shape that is 0.5 mm wide and 1.0 mm deep and yet the shape does not pose any airtightness problem during the hot pressing process. It is noted that a greater fusion depth or width as a result of the electron beam, while not posing any problem in airtight sealing performance, produces surface irregularities of the fusion zone, resulting in a crater-like dent. Thus, the fusion zone is preferably kept small.

The bond portion between the fuel nozzle 56 and the end flange 57 is preferably spaced apart from a nozzle wall surface. The multi-hole coaxial jet burner, however, has small intervals between nozzles and a space of at least 1.5 mm was necessary from the wall surface. Having the fusion zone at a flat portion on the surface of the end flange 57, specifically, to thereby avoid a curved portion at the nozzle root portion enables emission of the electron beam in parallel with a longitudinal direction of the nozzle and is thus preferable for bonding nozzles that are spaced apart from each other at small intervals. Additionally, not having the bond portion at the curved portion of the nozzle root portion allows favorable mechanical strength to be achieved with respect to the vibration stress acting on the nozzle.

It is noted that, although at least the surface side of the end flange 57 needs to be vacuum sealed by the electron beam, an ordinary welding such as brazing may be applied, instead of the electron beam welding, to the bottom surface side of the end flange free of the fuel nozzle, if the bonding interface can be airtightly sealed in a vacuum state.

The present embodiment has been described for an exemplary case of a fusion joint formed mainly by electron beam irradiation as the seal welding method applied to the surfaces of the fuel nozzle 56 and the end flange 57. This is nonetheless illustrative only and not limiting. Any other welding method may be used when the requirement that the bonding interface can be airtightly sealed in a vacuum state is satisfied.

As described above, the fuel nozzle structure of the gas turbine combustor according to the present embodiment can improve bonding strength between the fuel nozzle and the end flange (base plate). Durability and strength reliability of the fuel nozzle of the gas turbine combustor can thereby be improved.

Second Embodiment

Figure 4:
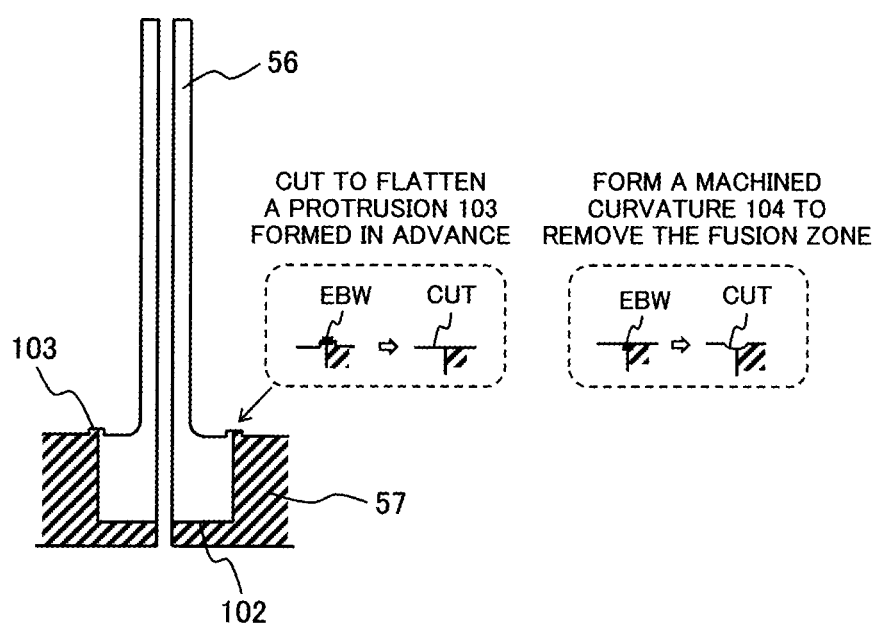
FIG. 4 is a cross-sectional view of a fuel nozzle in a gas turbine combustor according to an embodiment of the present invention.

A fuel nozzle structure in a second embodiment will be described with reference to FIG. 4. FIG. 4 shows a cross-sectional structure of a fuel nozzle 56 and an end flange 57 according to the present embodiment. In the present embodiment, a protrusion 103 is formed in advance at portions of a nozzle root portion and the end flange to which electron beam welding is applied and the protrusion 103 is flattened after the hot isostatic pressing (HIP) process.

Cutting to remove a fusion zone produced by the electron beam welding (electron beam welding (EBW)) flattens the end flange 57. This allows an undeposited portion that can occur at a bonding end portion to be readily identified and improves inspection performance when the burner including the fuel nozzle 56 is operated for a long time.

Additionally, the foregoing improves mechanical strength with respect to vibration stress occurring from combustion vibration and to thermal distortion acting on the end flange 57, to thereby considerably improve reliability. It is noted that, instead of having the protrusion 103 at the portion subjected to the electron beam welding, cutting to smooth the surface of the fusion zone (EBW) that has been formed on a flat portion can achieve the same effect. Additionally, as shown in FIG. 4, a machined curvature 104 may be formed by cutting to remove the surface of the fusion zone (EBW) that has been formed on the flat portion.

Third Embodiment

Figure 8A:
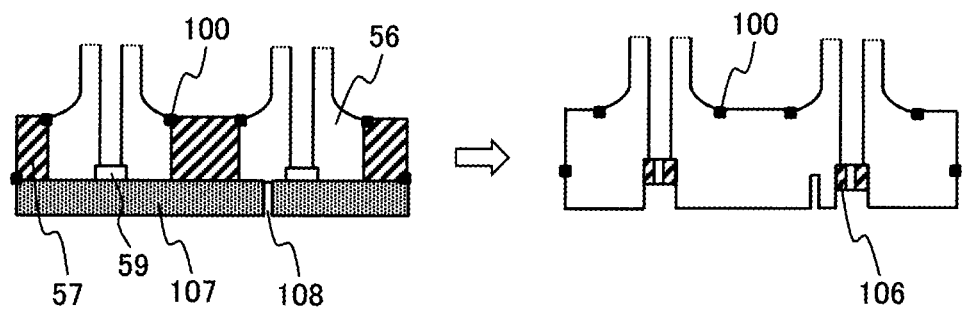
FIG. 8A is a diagram showing a manufacturing process of a fuel nozzle in a gas turbine combustor according to an embodiment of the present invention.

A fuel nozzle structure and a manufacturing method thereof in a third embodiment will be described with reference to FIGS. 8A to 8F. FIG. 8A outlines a manufacturing process in the present embodiment. FIGS. 8B to 8F show more detailed manufacturing steps. The left drawing of FIG. 8A shows a condition corresponding to FIG. 8D and the right drawing of FIG. 8A shows a condition corresponding to FIG. 8F. Each of FIGS. 8A to 8F shows only an area near a root of a fuel nozzle 56 and omits showing a shape of a leading end portion thereof.

In the manufacturing method for the fuel nozzle in the present embodiment, the fuel nozzle 56 is inserted into a hole provided in an end flange 57 and a bottom plate 107 is disposed on the side of a back surface of the end flange 57. Electron beam welding is performed on each of a bond portion between the fuel nozzle 56 and the end flange 57 and a bond portion between the end flange 57 and the bottom plate 107 to thereby form an electron beam weld line 100.

The hot isostatic pressing (HIP) process is thereafter performed to integrate the fuel nozzle 56 and the end flange 57 with the bottom plate 107 as shown at right of FIG. 8A and a hole communicating with an internal hole provided in the fuel nozzle 56 is formed in the bottom plate 107. An orifice 106 is disposed inside the hole in the bottom plate 107.

Figure 8B:
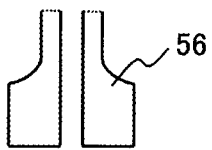
FIG. 8B is a diagram showing a manufacturing process of a fuel nozzle in a gas turbine combustor according to an embodiment of the present invention.
Figure 8C:
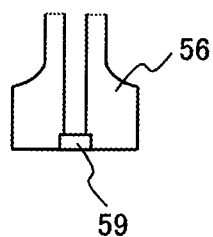
FIG. 8C is a diagram showing a manufacturing process of a fuel nozzle in a gas turbine combustor according to an embodiment of the present invention.
Figure 8D:
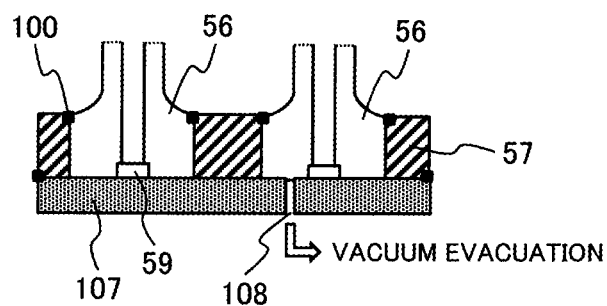
FIG. 8D is a diagram showing a manufacturing process of a fuel nozzle in a gas turbine combustor according to an embodiment of the present invention.

The above manufacturing method will be described in greater detail with reference to FIGS. 8B to 8F. First, as shown in FIGS. 8B and 8C, the internal hole in the fuel nozzle 56 is sealed by a sealing member 59. Next, as shown in FIG. 8D, the fuel nozzles 56 are inserted in respective holes provided in the end flange 57 and the bottom plate 107 is then disposed on the back surface of the end flange 57. Thereafter, at the root portions of the fuel nozzles 56, the boundary portions with the end flange 57 are vacuum sealed by electron beam welding as in the first embodiment. Additionally, the end flange 57 and the bottom plate 107 disposed on the back surface of the end flange 57 are welded together along an outer periphery of the end flange 57. At this time, the electron beam weld line 100 is formed along the bond portion between the fuel nozzle 56 and the end flange 57 and the bond portion between the end flange 57 and the bottom plate 107.

Figure 8E:
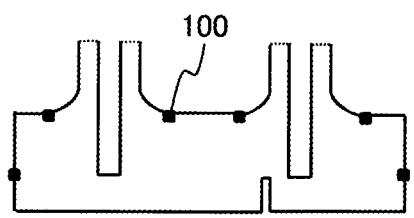
FIG. 8E is a diagram showing a manufacturing process of a fuel nozzle in a gas turbine combustor according to an embodiment of the present invention.
Figure 8F:
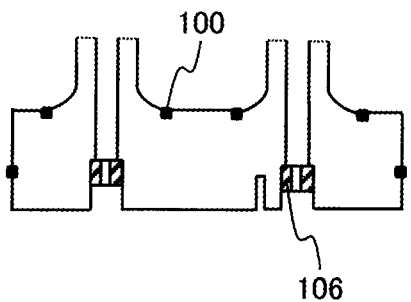
FIG. 8F is a diagram showing a manufacturing process of a fuel nozzle in a gas turbine combustor according to an embodiment of the present invention.

It is here noted that the bottom plate 107 has a vacuum evacuation hole 108 for vacuum evacuation formed therein. Performance of vacuum evacuation of each of bonding interfaces involving the fuel nozzles 56, the end flange 57, and the bottom plate 107 through the vacuum evacuation hole 108 allows sealing portions at the root portions of the fuel nozzles 56 vacuumized by, for example, the electron beam welding to be checked for, for example, a possible leak or other defect. Sealing the vacuum evacuation hole 108 provided in the bottom plate 107 after the vacuum evacuation process enables a vacuum to be maintained in the abovementioned bonding interfaces. The foregoing is subjected to the hot isostatic pressing (HIP) process, which achieves metallurgical bonding in the interfaces for integration as shown in FIG. 8E. The same processing conditions are used as in the first embodiment.

After the fuel nozzles 56, the end flange 57, and the bottom plate 107 have been integrated into a subassembly, holes are drilled in portions on the previous bottom plate 107 portion in the integrated subassembly, so that the holes communicate with the respective internal holes in the fuel nozzles and function as through holes. At this time, the holes are drilled in the bottom plate 107 to have hole diameters larger than hole diameters of the respective internal holes in the nozzle. Thus, slight misalignment between axes of the holes drilled and the internal holes poses no big problems. The orifices 106 for flow rate adjustment are then disposed in the holes drilled in the bottom plate 107. A flow rate characteristic of the fuel nozzles 56 is thereby equalized.

It is noted that, instead of using the sealing members 59, the bottom surfaces of the fuel nozzles 56 in which through holes are formed may be sealed through, for example, welding. It is further noted that, while the above has been described for an exemplary case in which the internal hole in the fuel nozzle 56 is sealed by the sealing member 59, the same state can also be achieved by having a closed bottom when the fuel nozzle 56 is subjected to a drilling operation.

The fuel nozzle structure and the manufacturing method according to the present embodiment are suitable when applied to a fuel nozzle structure in a gas turbine combustor after fluid characteristics of the fuel nozzle having a through internal hole have been evaluated.

Fourth Embodiment

Figure 3:
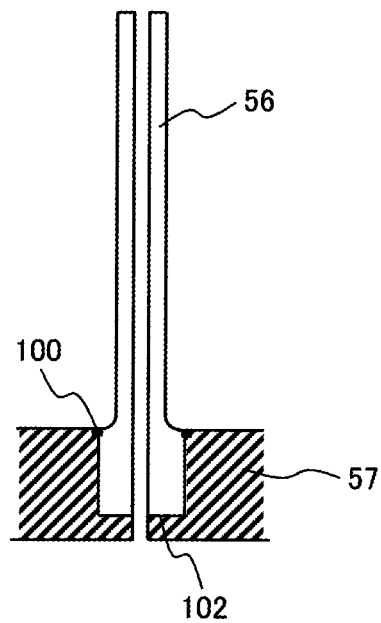
FIG. 3 is a cross-sectional view of a fuel nozzle in a gas turbine combustor according to an embodiment of the present invention.

A fuel nozzle structure according to a fourth embodiment will be described with reference to FIG. 3. In the present embodiment, a hole in an end flange 57 in which a fuel nozzle 56 is inserted has a positioning shoulder 102. The shoulder determines a position of the fuel nozzle 56 in a height direction and an angle of the fuel nozzle 56 with respect to the end flange 57. A surface of the end flange 57 is machined to a required depth to form the shoulder. Having the positioning shoulder 102 allows depths into which the fuel nozzles 56 disposed in a plane of the large end flange 57 are to be inserted to be selected as necessary. Additionally, having the positioning shoulder 102 allows the height of the fuel nozzle 56 to be accurately determined irrespective of smoothness of the surface of the end flange 57. When this method is adopted, preferably, the manufacturing method of the third embodiment in which the fuel nozzle 56 has a closed hole is used.

Fifth Embodiment

Figure 5:
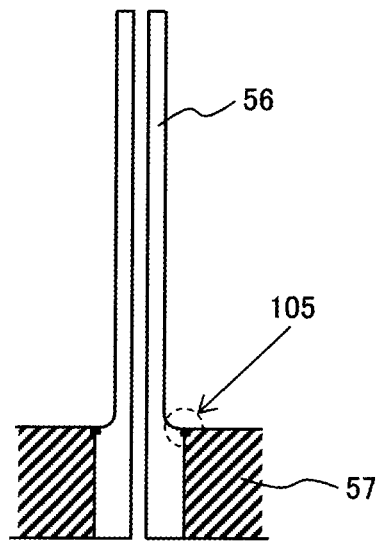
FIG. 5 is a cross-sectional view of a fuel nozzle in a gas turbine combustor according to an embodiment of the present invention.

A fuel nozzle structure according to a fifth embodiment will be described with reference to FIG. 5. In the present embodiment, brazing (brazing portion 105) is applied to an airtight seal between a root portion of a fuel nozzle 56 and an end flange 57. For a brazing material, BNi-5 complying with the JIS standards or other material having a high melting point is used. This is because of the following reason: specifically, the brazing material does not melt even with the application of the hot isostatic pressing (HIP) process at 1100° C. to the bonds between the fuel nozzle 56 and the end flange 57. The application of the brazing to the airtight seal between the fuel nozzle 56 and the end flange 57 can achieve the same effect as that achieved by the application of the electron beam welding.

Sixth Embodiment

Figure 6:
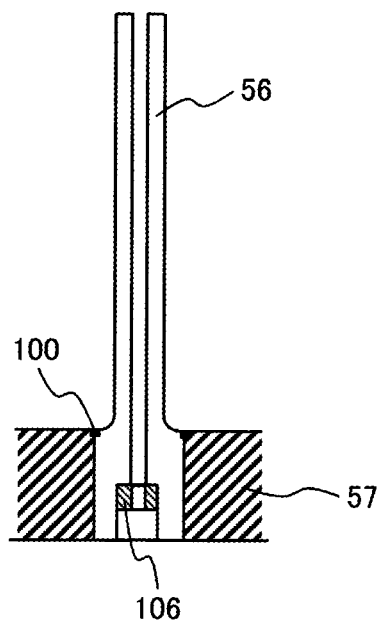
FIG. 6 is a cross-sectional view of a fuel nozzle in a gas turbine combustor according to an embodiment of the present invention.

A fuel nozzle structure according to a sixth embodiment will be described with reference to FIG. 6. In the present embodiment, a fuel nozzle 56 has a recess formed on a bottom surface side thereof. The recess communicates with a through hole through which fuel passes. An orifice 106 for flow rate adjustment is press-fitted in the recess of the fuel nozzle 56. As shown in FIG. 6, by providing the orifice 106 for flow rate adjustment at a part of the through hole of the fuel nozzle 56, a flow rate characteristic of a group of fuel nozzles can be made uniform.

It is noted that, although FIG. 6 illustrates an example in which a bond portion between the fuel nozzle 56 and an end flange 57 is bonded by electron beam welding (EBW), the orifice 106 for flow rate adjustment can achieve the same effect even with bonding by brazing as described with reference to the fifth embodiment.

Seventh Embodiment

Figure 11A:
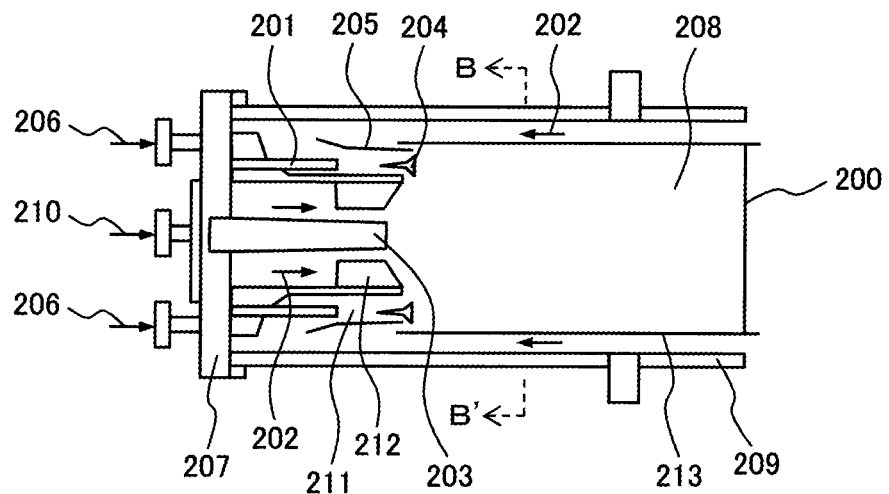
FIG. 11A is a cross-sectional view showing a schematic configuration of a gas turbine combustor according to an embodiment of the present invention.
Figure 11B:
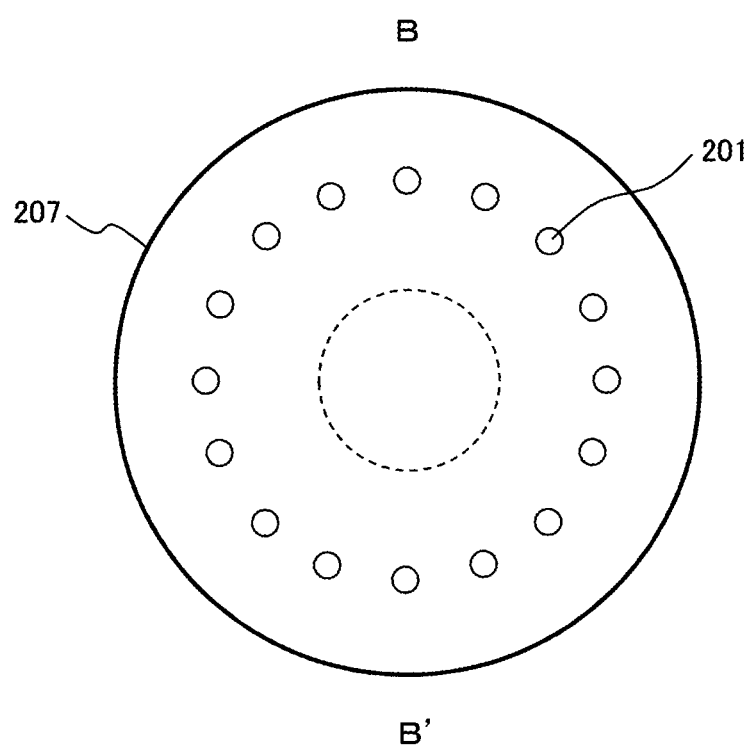
FIG. 11B is a view on arrow B-B' in FIG. 11A.

An embodiment in which the present invention is applied to another type of combustor is illustrated in FIGS. 11A and 11B. FIG. 11A is a cross-sectional view showing a main structure of a gas turbine combustor. FIG. 11B is a view on arrow B-B' in FIG. 11A. Reference symbol 200 denotes a gas turbine combustor. Reference symbol 208 denotes a combustion chamber. Reference symbol 203 denotes a diffusion fuel nozzle (pilot burner). Reference symbol 205 denotes a premixer. Reference symbol 201 denotes a premix fuel nozzle.

The gas turbine combustor 200 includes a diffusion burner 212 and a premix burner 211. The diffusion burner 212 includes the diffusion fuel nozzle 203 that injects diffusion combustion fuel 210 into the combustion chamber 208. The premix burner 211 includes the premix fuel nozzle 201 that injects premix fuel 206 into the premixer 205.

Specifically, the diffusion fuel nozzle 203 is disposed at a central portion upstream side of the combustion chamber 208. The diffusion fuel nozzle 203 is surrounded by a plurality of premixers 205 and fuel nozzles 201 for premixed combustion disposed thereround. The premix fuel nozzles 201 and the diffusion fuel nozzle 203 are mechanically bonded with an end flange 207.

Figure 12:
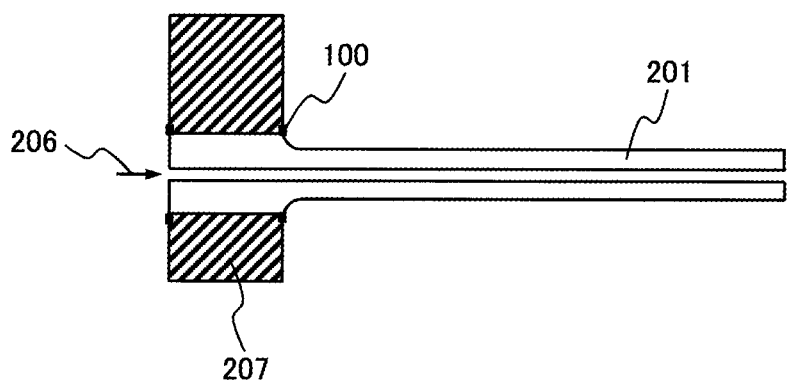
FIG. 12 is a cross-sectional view of a fuel nozzle in a gas turbine combustor according to an embodiment of the present invention.

FIG. 12 is a cross-sectional view of the premix fuel nozzle 201. The premix fuel nozzle 201 has a root portion vacuum sealed by electron beam welding (electron beam weld line 100) and metallurgically bonded by the hot isostatic pressing (HIP) process with the end flange 207. The bonding method or procedure in either one of the above-described embodiments is employed. Specifically, all of the above-described embodiments are applicable to not only the multi-hole coaxial jet burner, but also the bonding between the premix fuel nozzle and the end flange. The application of the present invention enables integration of the fuel nozzle with the end flange involving no undeposited portion therebetween, so that favorable structural strength and reliability can be achieved.

It should be noted that the present invention is not limited to the above-described embodiments and may include various modifications. The entire detailed configuration of the embodiments described above for ease of understanding of the present invention is not always necessary to embody the present invention. Part of the configuration of one embodiment may be replaced with the configuration of another embodiment, or the configuration of one embodiment may be added to the configuration of another embodiment. The configuration of each embodiment may additionally include another configuration, or part of the configuration may be deleted or replaced with another.

DESCRIPTION OF REFERENCE SYMBOLS

1: Combustion chamber
3: Combustor liner
12: Combustion air
41: Fuel
42: Mixture
53: Burner
54: Air hole plate
55: Air hole
56: Fuel nozzle
57: Fuel distributor (end flange)
59: Sealing member
60: Welded portion
100: Electron beam weld line
101: Fusion depth
102: Positioning shoulder
103: Protrusion
104: Machined curvature
105: Brazing portion
106: Orifice
107: Bottom plate
108: Vacuum evacuation hole
200: Gas turbine combustor
201: Premix fuel nozzle
202: Combustion air
203: Diffusion fuel nozzle (pilot burner)
204: Flame holder
205: Premixer
206, 210: Fuel
207: End flange
208: Combustion chamber
209: Outer tube wall
211: Premix burner
212: Diffusion burner
213: Inner tube wall

The invention claimed is:

1. A method for manufacturing a fuel nozzle for a gas turbine combustor, the method comprising:
 (a) fitting a fuel nozzle having an internal through hole into a through hole or a recess provided in a base plate;
 (b) bonding, by a fusion joint or a brazing joint, the fuel nozzle to the base plate in an interface therebetween on a surface of the base plate; and
 (c) following the step of (b), subjecting the fuel nozzle and the base plate to a pressure bonding process to thereby pressure bond the fuel nozzle and the base plate in the interface therebetween, the method further comprising:
 between the step of (a) and the step of (b), (d) covering with a bottom plate a surface of the base plate, the surface being opposite to the surface in which the fuel nozzle is fitted, wherein
 in the step of (b), the base plate and the bottom plate are bonded by a fusion joint or a brazing joint in an interface therebetween.

2. The method for manufacturing a fuel nozzle for a gas turbine combustor according to claim 1, the method further comprising:
 following the step of (c), (f) drilling a hole in the bottom plate to thereby causing the through hole in the fuel nozzle to pass through the bottom plate.

3. The method for manufacturing a fuel nozzle for a gas turbine combustor according to claim 1, the method further comprising:
 prior to the step of (a), (e) closing a bottom surface portion of the through hole in the fuel nozzle, wherein
 following the step of (b), each of interfaces of the fuel nozzle, the base plate, and the bottom plate is vacuum evacuated using a vacuum evacuation hole formed in the bottom plate.

4. The method for manufacturing a fuel nozzle for a gas turbine combustor according to claim 3,
 wherein the interface in each of the fuel nozzle, the base plate, and the bottom plate is subjected to a vacuum leak test using the vacuum evacuation hole.

* * * * *